(12) United States Patent
Gibson et al.

(10) Patent No.: US 6,990,530 B1
(45) Date of Patent: *Jan. 24, 2006

(54) METHOD AND APPARATUS FOR FAULT ISOLATION ON NETWORK LOOPS

(75) Inventors: Gavin G. Gibson, Westminster, CO (US); Sam Gibson, Egham (GB); Yuan Zhang, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 758 days.

This patent is subject to a terminal disclaimer.

(21) Appl. No.: 09/896,507

(22) Filed: Jun. 29, 2001

(51) Int. Cl.
*G06F 15/16* (2006.01)
*G06F 11/00* (2006.01)

(52) U.S. Cl. .......................... 709/238; 714/8
(58) Field of Classification Search ............... 709/238, 709/223, 205; 711/111–112, 170; 370/241; 714/4–8
See application file for complete search history.

(56) References Cited

U.S. PATENT DOCUMENTS

| | | | |
|---|---|---|---|
| 6,209,023 B1 * | 3/2001 | Dimitroff et al. ............ | 709/211 |
| 6,298,398 B1 | 10/2001 | Elliott et al. | |
| 6,343,324 B1 * | 1/2002 | Hubis et al. ................. | 709/229 |
| 6,490,253 B1 * | 12/2002 | Miller et al. ................. | 370/241 |
| 6,571,355 B1 | 5/2003 | Linnell | |
| 6,671,789 B1 * | 12/2003 | He et al. ..................... | 711/170 |
| 6,678,839 B2 * | 1/2004 | Mori ............................ | 714/44 |
| 6,766,466 B1 | 7/2004 | Jibbe | |
| 6,862,690 B1 | 3/2005 | Bezera et al. | |

OTHER PUBLICATIONS

American National Standards Institute. "Fibre Channel-Arbitrated Loop (FC-AL)". © 1996 by Information Technology Industry Council (ITI). 1-90.
American National Standards Institute. "Fibre Channel: Physical and Signaling Interface (FC-PH)". Revision 4.3; Jun. 1, 1994. i-xxxiv and 1-388.
National Committee for Information Technology Standards (NCITS). "Extended Modes for READ/WRITE BUFFER". Jun. 17, 1998.
Petrich, Dennis. "Fibre Channel-Methodologies for Jitter Specification", Technical Report REV 10, Jun. 9, 1999. i-ix, 1-96.
Roberts, Ron. "SCSI Domain Validation Technical Report-SDV". Revision 03A, Oct. 30, 2000. 1-12.
U.S. Appl. No. 09/896,662, filed on Jun. 29, 2001, entitled "Method and Apparatus for Fault Isolation on Network Loops Using Low Level Error Counters", invented by G.G. Gibson; S. Gibson; and Y. Zhang.

* cited by examiner

*Primary Examiner*—William C. Vaughn, Jr.
*Assistant Examiner*—Jude J. Jean-Gilles
(74) *Attorney, Agent, or Firm*—Meyertons Hood Kivlin Kowert & Goetzel, P.C.; B. Noël Kivlin

(57) ABSTRACT

Methods, systems and programs for isolating faults in a network loop is described. The link between the last device and the initiator in the network loop is tested. The loop segment between the initiator and the last device in the network loop is testesd. If a faulty link is identified in the loop segment between the initiator and the last device, then a faulty loop segment is identified and the faulty link within the faulty loop segment is isolated. For various embodiment of the present invention, divide and conquer testing or other systematic testing methods may be used to isolate the faulty link.

53 Claims, 8 Drawing Sheets

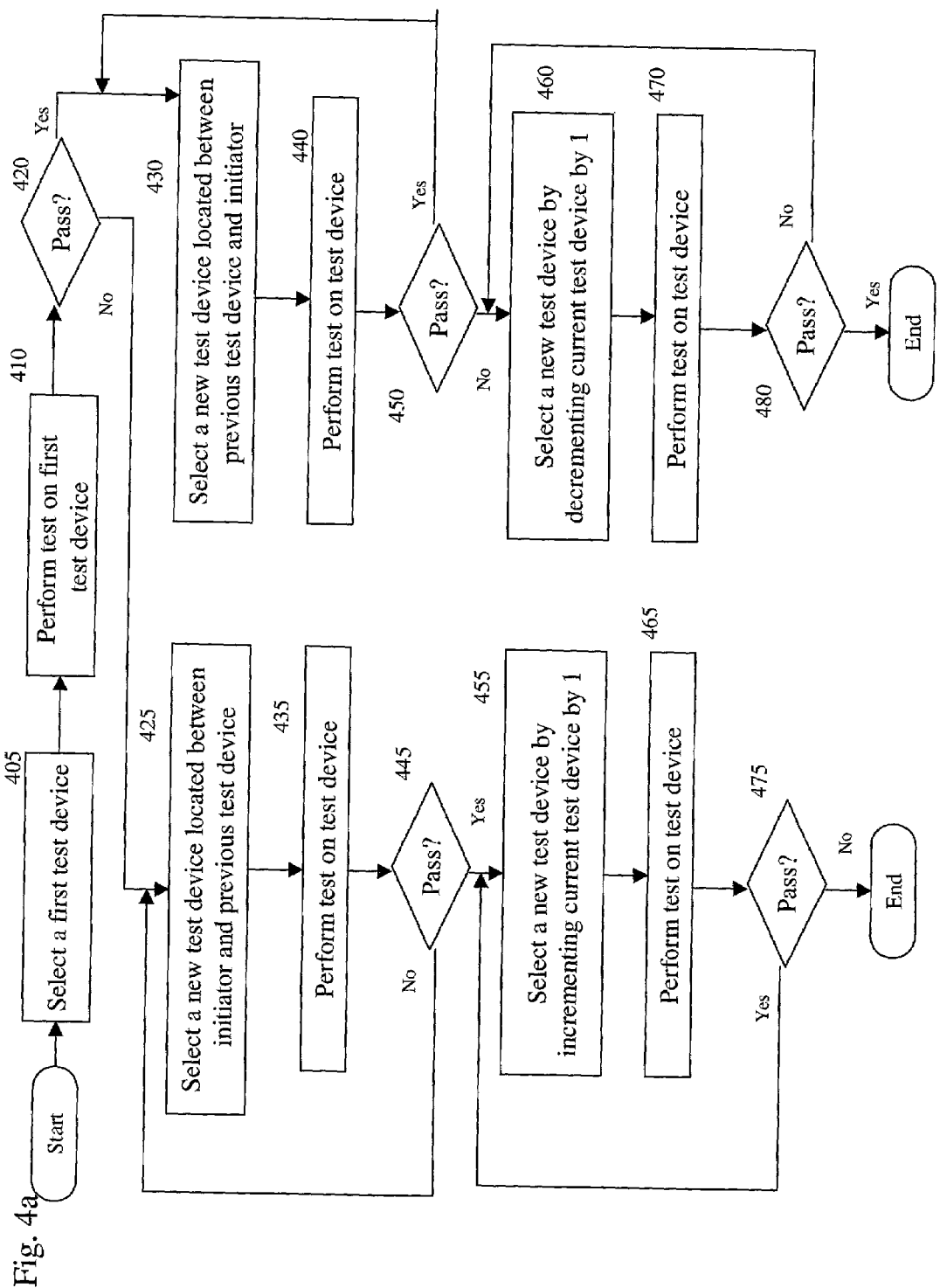

METHOD AND APPARATUS FOR FAULT ISOLATION ON NETWORK LOOPS

FIELD OF THE INVENTION

The present invention relates to isolating faulty links in a network loop.

BACKGROUND OF THE INVENTION

Storage area networks, also referred to as SANs, are dedicated networks that connect one or more systems to storage devices and subsystems. Today, fibre channel is one of the leading technologies for SANs. In general, fibre channel encompasses three networking topologies: point-to-point, loop, and fabric. In a point-to-point topology, a fibre channel host adapted in a system is connected to a single fibre channel storage subsystem. In a fibre channel loop network, also called an arbitrated loop, the loop is constructed by connecting nodes together in a single logical ring. Loops can be constructed by connecting nodes through a fibre channel hub in a star-wired topology or by connecting them together in a connected physical loop from node to node. In a fibre channel fabric topology, the storage networks are constructed with network switches. A fabric can be composed of a single switch or multiple switches. Ports on fabric networks connect nodes to switches on low-latency, point-to-point connections.

In fibre channel loop topologies, diagnostics often become difficult because the problems are often propagated across the entire loop. One method of isolating faulty devices in a loop is by a process of elimination. This consists of running a series of link tests on the loop by bypassing individual devices in the loop (i.e., replacing/removing components on the loop) until one or more faulty links are identified. This method results in excessive MTTD (mean time to diagnose) and may require field personnel to be present. Furthermore, this method requires additional hardware and bypass circuitry to be added to the devices connected to the loop.

SUMMARY OF THE INVENTION

Methods, systems and programs for isolating faults in a network loop is described. The link between the last device and the initiator in the network loop is tested. The loop segment between the initiator and the last device in the network loop is testes. If a faulty link is identified in the loop segment between the initiator and the last device, then a faulty loop segment is identified and the faulty link within the faulty loop segment is isolated. For various embodiment of the present invention, divide and conquer testing or other systematic testing methods may be used to isolate the faulty link.

BRIEF DESCRIPTION OF THE DRAWINGS

The present invention is illustrated by way of example and not limitation in the figures of the accompanying drawings in which like references indicate similar elements:

FIG. 4a illustrates a flow chart for performing a divide and conquer test according to one embodiment of the present invention;

DETAILED DESCRIPTION

Methods and systems for isolating faulty links in a network loop are described. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
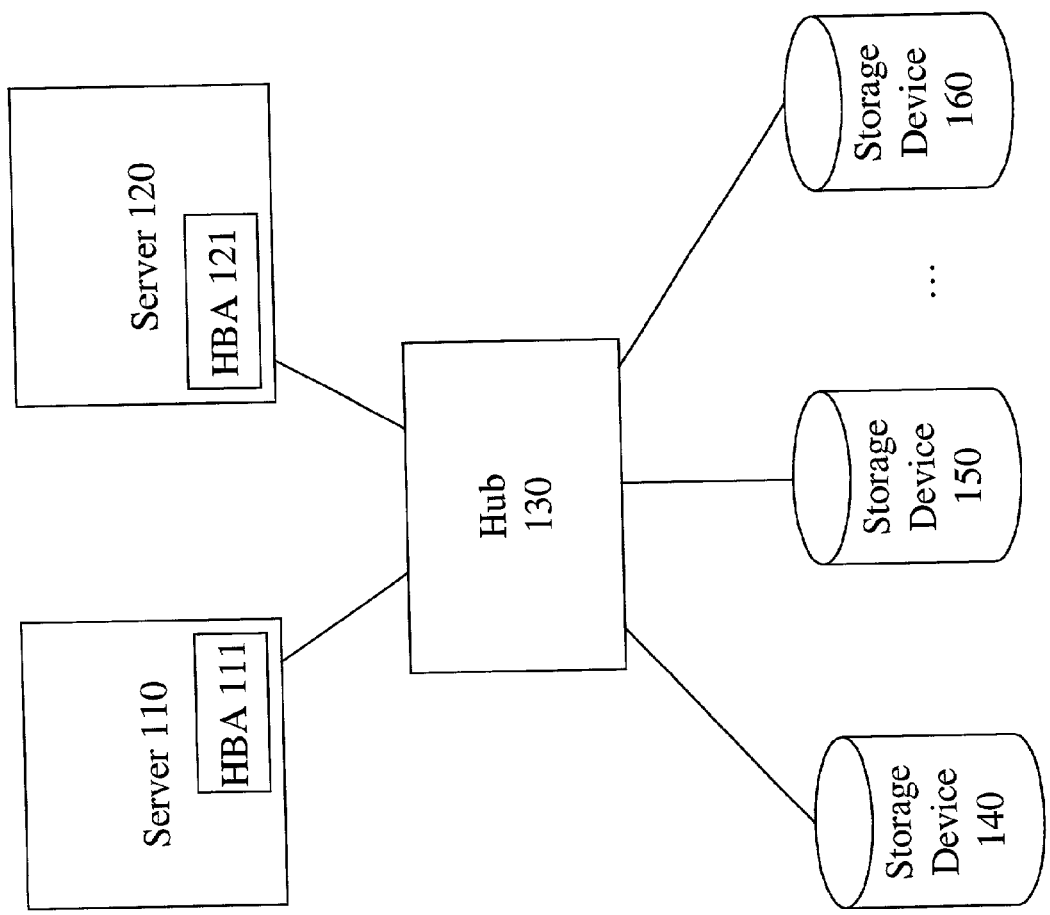
FIG. 1 illustrates an example of a storage network.

FIG. 1 illustrates an example of a storage area network (SAN) 100 having a loop topology. The described methods and systems may be used to isolate faulty links in SAN 100. Servers 110 and 120 are coupled to Storage Devices 140, 150, and 160 via a Hub 130. Storage Devices 140, 150, and 160 are coupled to Hub 130 in a star topology (not shown) to create a loop. Alternatively, the storage devices in a network loop may be serially linked without a hub. Redundant Array of Independent Disk (RAID) arrays, tape backup, tape library, CD-ROM library, JBOD (Just a Bunch of Disks), and disk drives are examples of storage devices. Servers 110 and 120 include host bus adapters (HBAs) 111 and 121, respectively, for addressing Storage Devices 140, 150, and 160 and transferring Input/Output (I/O) request commands and data to Storage Devices 140, 150, and 160. Alternatively, Servers 110 and 120 may be replaced with host computers that may comprise any digital processing system that is capable of submitting an I/O request to Storage Devices 140, 150, and 160, such as a workstation, desktop computer, mainframe, laptop computer, handheld computer, telephony devices, etc. It should be noted that in a network loop, the number of storage devices and servers may vary. Alternatively, the HBA may be replaced with an I/O controller, which is integrated on the system board rather than a plug-in adapter.

Figure 2:
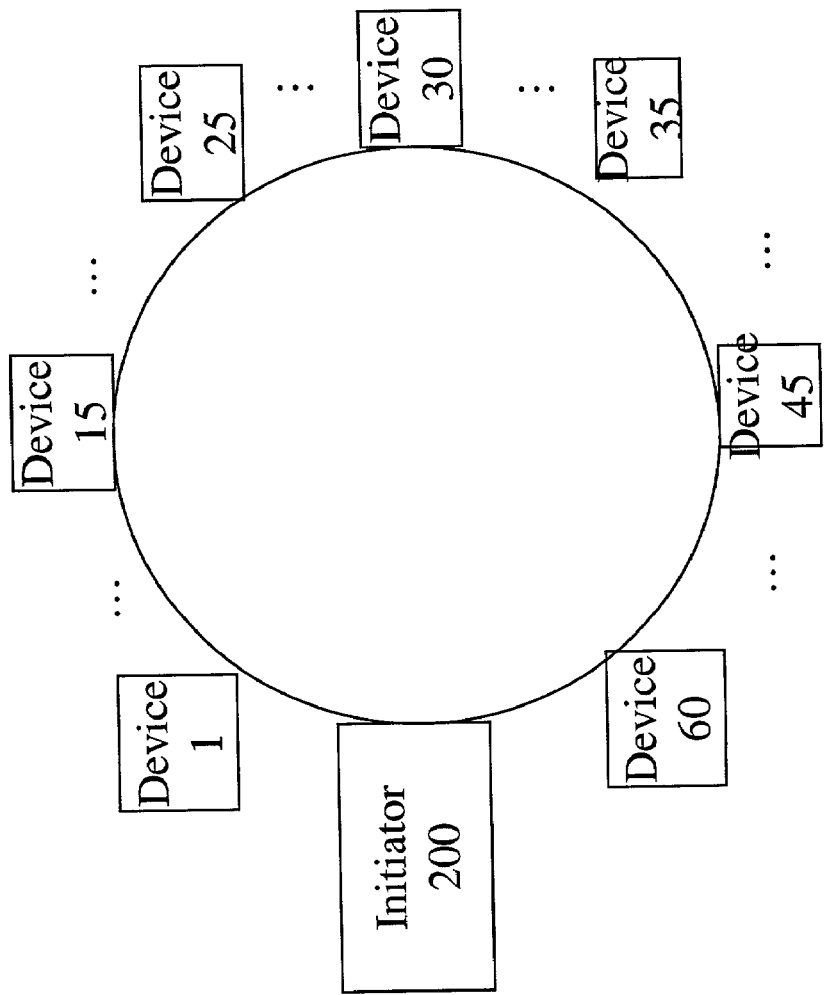
FIG. 2 illustrates an example of a network loop.

FIG. 2 illustrates an example of a network loop 200 with a HBA 210 (also referred to as an initiator) and Devices 1 thru 60. Note that only Devices 1, 15, 25, 30, 35, 45 and 60 are shown. Network loop 200 may represent a fibre channel arbitrated loop as defined by the American National Standards Institute (ANSI) in document X3.272-1996 entitled "Fibre Channel Arbitrated loop." For a fibre channel arbitrated loop, the link may comprise of copper wires or optical fiber. However, it should be noted that network loop 200 is not limited to fibre channel loops and may include any type of loop having devices connected serially in a ring or star topology. Furthermore, it should be noted that the number of devices in a network loop may vary and that network devices, such as Devices 1 thru 60, are not limited to storage devices and may include other network devices such as hubs, switches, enclosure service processors, HBAs, hosts, etc.

For one embodiment of the present invention, the network devices are required to have a buffer for storing test pattern data locally on the device such as in the device cache buffer. For further embodiments of the present invention, each network device must be able to receive a non-intrusive SCSI command, such as a SCSI write/read buffer command as described in Document Number T10/98-184r0 of the National Committee for Information Technology Standards (NCITS). The_SCSI write buffer command sends I/O to the target devices which is stored in the device cache buffer (and not actually written to the media). The SCSI read/write buffer commands are used to read/write test patterns to identify link errors. For example, certain fibre channel patterns such as 0x7e7e7e7e and 0x5a5a5a5a, which is defined in the National Committee for Information Technology Standard (NCITS) document TR-25:1999 entitled "Methodology of Jitter Specification," may be used become those patterns are more likely to create link errors due the difficulty in recovering the clock from the encoded serial pattern. Additionally, for some embodiments of the present invention, the order of the devices in the loop must be known and the system (or host) must be able to send I/O (e.g., SCSI commands) to every device on the loop. When implementing a fibre channel network loop, an initialization phase (referred to LILP in the fibre channel specification FC-AL) allows the loop order to be known.

For the described embodiments, a link refers to the transmission medium between a transmitting device and a receiving device. For one embodiment of the present invention data is transmitted in a clockwise direction, starting with the initiator. For the network loop example shown in FIG. 2, when data is being transmitted in a clockwise direction, Device 1 is referred to as the first device in the loop and Device 60 is referred to as the last device in the loop. Although it is not a requirement for the present invention that data be transmitted in a clockwise direction in the network loop, the embodiments described below assume that data is transmitted in a clockwise direction.

Figure 3:
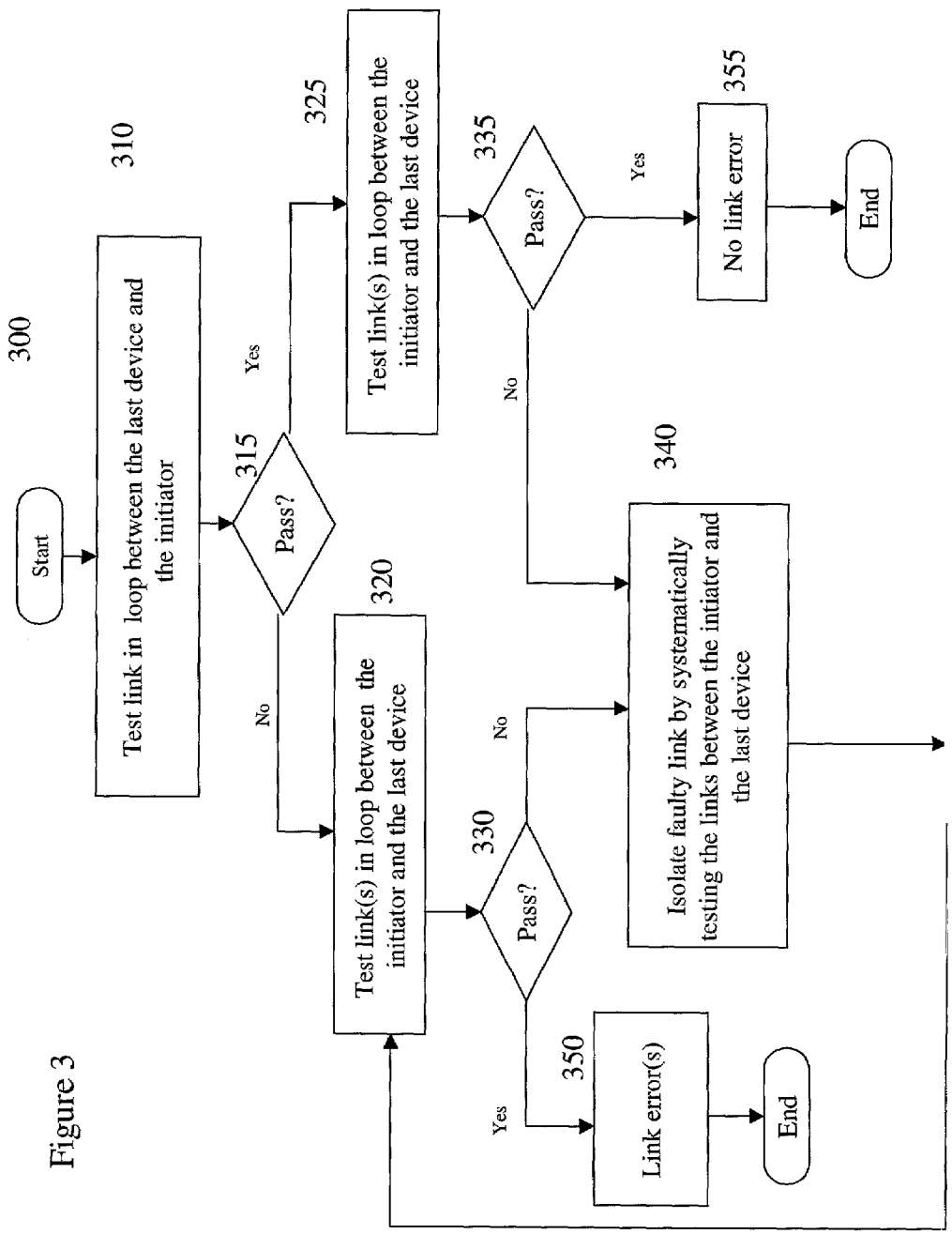
FIG. 3 illustrates a flow chart for testing a network loop according to one embodiment of the present invention.

FIG. 3 is a flow chart illustrating a method of isolating faulty links in a network loop according to one embodiment of the present invention. The link between the last device in the loop and the initiator is tested, as shown in box 310.

For one embodiment of the present invention, the last device in the loop is tested by running a SCSI write/read buffer command to it by writing a pattern once to the device buffer and then doing continuous reads of the device buffer. This is also referred to as the single write/multiple read test or read test.

A determination is made whether the last device in the loop passes the test, as shown in 315. If the last device in the loop passes the read test, then the link between the last device in the loop and the initiator is a good link. If the last device in the loop fails this read test, then the link between the last device in the loop and the initiator is a faulty link. If the last device passes the read test or if the single write to the device fails, the next step is to test the loop segment between the initiator and the last device, as shown in boxes 320 and 325. This test may be referred to as the write test.

For one embodiment of the present invention, one or more SCSI write buffer commands (writes only) are run to the last device in the loop to test the loop segment between the initiator and the last device. For one embodiment of the present invention, successive writes are made to the last device in the loop. For a typical network loop, there are several network devices located between the initiator and the last device in the loop. If the last device passes this test, then there is no faulty link between the initiator and the last device. If the last device fails this test, then there is at least one faulty link between the initiator and the last device.

If it is determined at box 335 that there are no faulty links (i.e., test passed) in the loop segment between the initiator and the last device, then no faulty links have been identified in the network loop. At that point, no faulty links are identified, as shown in box 355 and the testing is completed.

On the other hand, if one or more faulty links have been identified in the loop segment between the initiator and the last device, then the faulty link(s) are isolated as shown in box 340. Box 320 may be repeated until all the faulty links are isolated.

If it is determined in box 330 that there are no faulty links (i.e., test passed), then the only faulty link identified in the network loop is between the last device and the initiator. If it is determined in box 330 that there is one or more faulty links between the initiator and the last device, then the faulty link(s) are isolated as shown in box 340. Box 320 may be repeated until all the faulty links are isolated.

For one embodiment of the present invention, the faulty link(s) can be isolated by systematically testing the target devices between the initiator and the last device. For example, testing the second to the last device in the loop, and then testing the third to the last device in the loop, and so forth until the target devices passes the test. Once the target device passes the test, the faulty link is located between the passing target device and the previous failed target device. Another example of systematically testing the target devices between the initiator and the last device is by performing divide and conquer tests. Examples of divide and conquer tests will be described in further detail below in conjunction with FIGS. 4a and 4b. In general, performing divide and conquer testing involves performing successive write tests to selected middle devices.

Generally, fibre channel patterns that are known to aggravate FC-AL links are selected and the reading and writing of these patterns are performed as fast as possible. It should be noted that in substantially all FC-AL devices, there is a low level error checking mechanism so when a write error occurs and data gets corrupted, the first device to detect the error will throw away the frame and increment the appropriate low level error counter. On reads, the same thing occurs. Furthermore, it should be noted that a SCSI write buffer command will fail if the write is not acknowledged by the receiving device. This typically indicates that the data got lost and is also referred to as a SCSI timeout. On the other hand, if a SCSI read buffer command fails, it will be reported as a SCSI parity error. This may occur if any part of the fibre channel frame is corrupted. Therefore, since fibre channel data is CRC protected and FC-AL has low level counters that are used to discard frames that are corrupted, it is certain that if a SCSI timeout/SCSI parity error is not received after a SCSI write/read buffer command, then there is no error and the test device passes the test.

A fibre channel frame is defined in the low level fibre channel specification such as the FC-PH specification entitled "Fibre Channel Physical and Signaling Interface" (ANSI X3.230:1994). In short, a fibre channel loop will having IDLE's on the link unless data is being transmitted. If data is being transmitted, it will be contained in one or more frames. For one embodiment of the present invention, a frame has the following fields: Start of Frame (SOF), Header (address and other information), Payload (data), CRC (error checking), and End of Frame.

The low level counters are also described in the FC-PH specification. According to the FC-PH specification, fibre channel devices may have low level counters. These counters are also known as the LESB (link error status block) and are read using a fibre channel extended link services command. Some of the the counters available include the following: CRC errors (a count of CRC errors received by a device), IT errors (a count of invalid FC characters received by a device, where a character refers to a byte which is converted to 10-bits), LOS (loss of synchronization in the link) Link Reset (detection of link reset), etc.

In one embodiment of the present invention, the low level counters in fibre channel devices may be used to select the first test device when performing divide and conquer testing or other tests used to isolate faulty links between the initiator and the last device. This implementation is described further in accordance with FIG. 4c.

Figure 4B:
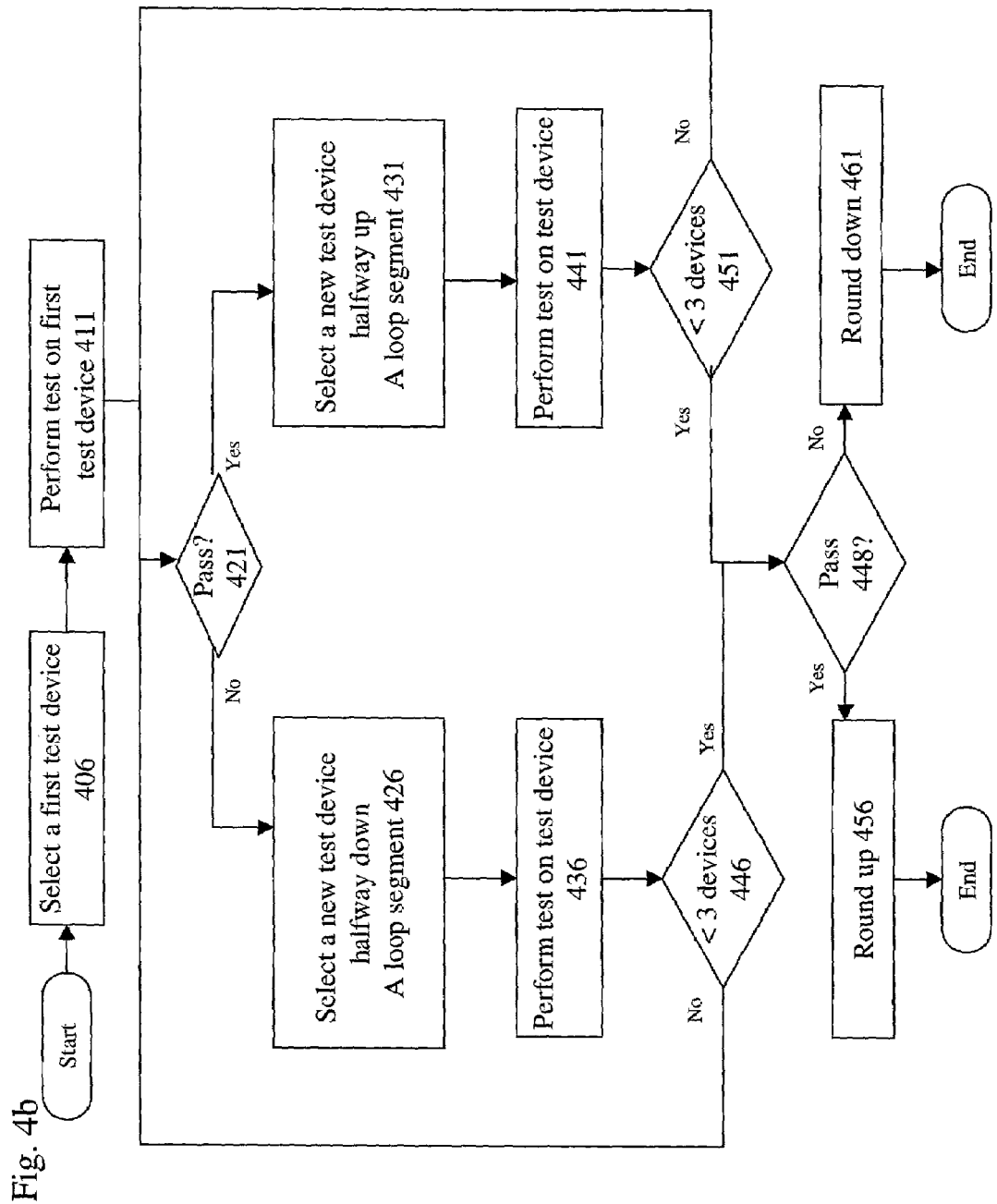
FIG. 4b illustrates a flow chart for performing a divide and conquer test according to an alternative embodiment of the present invention.

For various embodiments of the present invention, isolating faulty links by systematically testing the links between the initiator and the last device, as shown in box 340, may be implemented by performing a divide and conquer type of test. FIGS. 4a and 4b illustrate examples of divide and conquer test methods.

Referring now to FIG. 4a, a first test device in the loop is selected. For one embodiment of the present invention, a device located in the middle of the loop is selected as the first test device. The first test device divides the loop segment between the initiator and the last device into two segments. The first loop segment includes all devices/links between the initiator and the first test device and the second loop segment includes all devices/links between the first test device and the last device in the loop and the link segment which returns to the initiator. The test is performed on the first test device, as shown in box 410, and a determination is made whether the first test devices passes the test, as shown in box 420.

For one embodiment of the present invention, the first test device is tested by running one or more SCSI write buffer commands using various data patterns. If the first test device passes the test, then the first loop segment does not contain any faulty links and the testing is continued on the second loop segment by proceeding to boxes 430, 440, 450, 460, 470 and 480. At this point, the suspect link is in the second loop segment and the first loop segment is ruled out as having the suspect device/link. If the first test device fails the test, then the first loop segment contains at least one faulty link and testing is continued on the first loop segment to isolate the faulty link(s) by proceeding to boxes 425, 435, 445, 455, 465 and 475. At this point, there is at least one suspect link in the first loop segment.

If the first test device passes in 420, then a new test device is selected in box 430. The new test device is a device between the first (or previous) test device and the initiator. For one embodiment of the present invention, the new test device is located in the middle of the loop segment between the first (or previous) test device and the initiator. The new test device is tested in box 440. For one embodiment of the present invention, the new test device is tested by running a SCSI write buffer command. Boxes 430 and 440 are repeated until the current test device fails the test. Each time the current test device passes the test in box 440, testing is focused on the second loop segment (i.e., segment between the current test device and the initiator).

Once the current test device does not pass in box 450, then a new test device s selected, as shown in box 460 and then tested, as shown in box 470. For one embodiment of the present invention, the new test device is tested by running a SCSI write buffer command. The new test device may be the device located immediately before (in the counter clockwise direction) the current test device in the loop. In other words, the new test device may be selected by decrementing the current test device by 1. For example if the current test device is device 50, then the new test device selected would be device 49. Boxes 460 and 470 are repeated until the new test device passes the test. Once the new test device passes the test, the faulty link can be identified. Further testing can be performed to determine the faulty device(s) which may include the link itself or any device attached to it.

If the first test device fails in 420, then a new test device is selected in box 425. The new test device is a device between the initiator and the first (or previous) test device. For one embodiment of the present invention, the new test device is located in the middle of the loop segment between the initiator and the first (or previous) test device. The new test device is tested in box 435. For one embodiment of the present invention, the new test device is tested by running a SCSI write buffer command. Boxes 425 and 435 are repeated until the current test device passes the test. Each time the current test device fails the test in box 435, testing is focused on the first loop segment (i.e., the segment between the initiator and the current test device).

Once the current test device passes in box 445, then a new test device is selected, as shown in box 455 and then tested, as shown in box 465. For one embodiment of the present invention, the new test device is tested by running a SCSI write buffer command. The new test device may be the device located immediately after (in the clockwise direction) the current test device in the loop. In other words, the new test device may be selected by incrementing the current test device by 1. For example, if the current test device is device 15 then the new test device would be device 16. Boxes 455 and 465 are repeated until the new test device passes the test. Once the new test device fails the test, the faulty link can be identified. Further testing can be performed to determine the faulty device(s), which may include the link itself or any of the devices attached to it.

FIG. 4b illustrates an alternative method of performing a conquer and divide test according to various embodiments of the present invention. Similar to FIG. 4a, a first test device is selected and tested as shown by boxes 406 and 411. For one embodiment of the present invention, a device located in the middle of the loop is selected as the first test device. The first test device divides the loop segment between the initiator and the last device in the loop into two loop segments. For one embodiment of the present invention, the first device is tested by running a SCSI write buffer command. If the first test device passes the test at 421, then the suspect device is located in the second half of the loop and the method proceeds to boxes 431, 441, 451 and 461. On the other hand, if the first test device fails the test at 421, then the suspect device is located in the first half of the loop and the method proceeds to boxes 426, 436, 446, and 456.

If the write test fails in 421, then a new test device is selected as shown in box 426. The new test device chosen is halfway down the loop in the segment between the initiator and the first test device (i.e., first loop segment). Once selected, the test device is tested as shown in box 436.

On the other hand, if the write test passes in 421, then a new test device is selected in box 431 and then tested in box 441. The new test device chosen is halfway up the loop in the segment between the first test device and the initiator (i.e., second loop segment).

Next, a determination is made as to whether there is less than three devices in the loop segment (decision boxes 446 and 451). If there is not less than three devices in the loop segment, then the method returns to decision box 421. On the other hand, if there is less than three devices in the loop segment, then the method proceeds to decision box 448. If the write test passes and there are less than three devices, then a round up procedure as shown in box 456 is performed. If the write test fails and there are less than three devices, then a round down procedure as shown in box 457 is performed. When performing a round up or round down procedure, the next device up or down in the loop is selected as a faulty device.

For one embodiment of the invention, to test for multiple faulty links, validation tests may be performed after each faulty device is fixed or replaced and then repeating flow chart 300 shown in FIG. 3, or portions of flow chart 300, to isolate additional faulty links/devices.

Figure 4C:
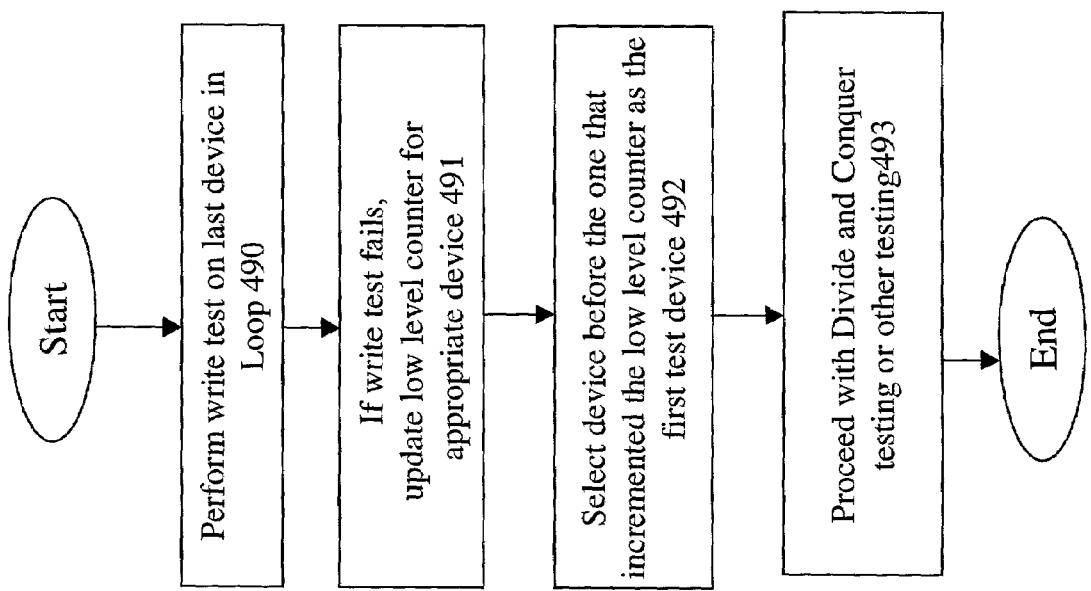
FIG. 4c illustrates a flow chart for selecting a first test device to perform divide and conquer testing according to one embodiment of the present invention.

FIG. 4c illustrates a method for selecting the first test device when isolating the faulty link between the initiator and the last device by performing divide and conquer testing or other systematic testing. After performing a single write/multiple read test on the last device (and if the last device passes the read portion of the write/multiple read test or fails the single write portion of the write/multiple read test), a write test is performed on the last device in the loop, as shown in box 490. For one embodiment of the present invention, one or more SCSI write buffer commands are run to the last device in the loop to test the loop segment between the initiator and the last device.

If the write test fails, the first device to detect the error will discard (or mark as bad) the frame and update the low level counter of the appropriate device, as shown in box 491. For one embodiment of the present invention, the low level counter is a low level error counter for tracking invalid transmission words or IT errors. For alternative embodiments, other available low level counters may be used. These types of low level counters are often a good indication of where the faulty link is in the loop segment. This may allow a better first test device selection than simply starting with the middle device in the loop.

When selecting the first device for performing divide and conquer testing or other types of systematic tests to isolate faulty links between the initiator and the last device, the device before the one that incremented the low level counter is selected. Once the first test device is selected, proceed to isolate the faulty link between the initiator and the last device, as shown in box 493. By monitoring these counters during the write test to the last device, the drive just before the one that incremented the low level counter can be used as the staring point for divide and conquer testing or other tests to isolate the faulty links.

Below are some examples of applying the divide and conquer test flow chart shown in FIGS 4a and 4b to Network Loop 200 shown in FIG. 2. It should be noted that prior to performing the divide and conquer tests, the last device in the loop is tested.

If the last device in the loop passes the read and write tests (refer to discussion of boxes 310, 320, and 325 shown in FIG. 3), then it may not necessary to perform divide and conquer testing because the reads having successfully traversed the path between the last device and the initiator, and the writes have successfully traversed the path between the initiator and the last device, leaving no suspect faulty devices.

On the other hand, if the last device in the loop fails the single write/multiple reads test (refer to discussion of box 310) during the reads, then the link between the last device and the initiator is suspect. If the last device fails the writ test (refer to discussion of box 320 and 325), then divide and conquer testing may be performed to isolate the faulty link(s). For divide and conquer testing, a successive write test is performed on the selected middle device.

Example 1

Assume Device 3 is a Faulty Device

After determining that there is at least one link error between the initiator and the last device, the divide and conquer test methodology shown in FIG. 4a may be used to isolate the faulty link. Device 30 in network loop 200 may be selected as the first test device because it is the middle device in network loop 200 (box 405). Although it may be preferable to select one of the devices in the middle of the loop for the first test device, it is not necessary. The first test device is tested (box 41) and fails the test (box 420). This suggests there is at least one suspect link is between the initiator and the first test device.

Device 15, which is located midway between the initiator and the previous test device (Device 30), may be selected as the new test device (box 425). Device 15 is tested (435) and fails the test (box 435, 445). This suggests that the suspect link is Device 15 or located before Device 15.

Then, Device 7, which is located midway between the initiator and the previous test device (Device 15), may be selected as the new test device (box 425). Device 7 is tested (box 435) and fails the test (box 445). This suggests that the suspect link is Device 7 or located before Device 7.

Then, Device 3, which is located midway between the initiator and the previous test device (Device 7), may be selected as the new test device (box 425). Device 3 is tested (box 435) and fails the test (box 445). This suggests that the suspect link is Device 3 or located before Device 3.

Then, Device 2 may be selected as the new test device (box 425). Device 2 is tested (box 435) and passes the test (box 445). This suggests that the suspect link is after Device 2. Once Device 2 passes, then the faulty link is identified as being between Devices 2 and 3.

Alternatively, referring now to FIG. 4b, after Device 3 has been selected as the new test device and it has been determined that there are less than three devices in the loop segment (box 446) and Device 3 fails the test (box 448), then Device 3 is rounded down to Device 2 (box 457). The faulty link is then between Device 2 and Device 3.

Example 2

Assume Device 20 is a Faulty Device

After determining that there is at least one link error between the initiator and the last device, the divide and conquer test methodology shown in FIG 4a may be used to isolate faulty link. Device 30 in network loop 200 may be selected as the first test device because it is the middle device in network loop 200 (box 405). Although it may be preferable to select one of the devices in the middle of the loop for the first test device, it is not necessary. The first test device is tested (box 410) and fails the test (box 420). This suggests there is at least one suspect link is between the initiator and the first test device.

Device 15, which is located midway between the initiator and the previous test device (Device 30), may be selected as the new test device (box 425). Device 15 is tested (435) and passes the test (box 445). This suggests that the suspect link is located between Device 15 and Device 30.

Device 16 is selected as the new test device (box 455). Device 16 is selected by incrementing Device 15 by 1. Device 16 is tested (box 465) and passes the test (475). Next, Device 17 is selected as the new test device (box 455). Device 17 is tested (box 465) and passes the test (box 475).

Repeating boxes 455, 465, and 475 until Device 20 is selected as the new test device (box 455). Device 20 is tested (box 465) and fails the test (box 475). This suggests that the faulty link is between Devices 19 and 20.

Alternatively, referring now to FIG. 4b, once Device 15 is selected as the new test device and is tested (boxes 426 and 436), it is determined that there are more than three devices in the loop segment between Device 15 and Device 30 (box 446). Thus, it is determined in box 421 whether Device 15 passes or fails the test. Since Device 15 passes the test, a new test device (Device 22) halfway up the loop segment is selected and tested (boxes 431 and 441). Since the loop segment has more than three device, the method returns to decision box 421 where it is determined that Device 22 fails the test. Then, Device 19 is selected as the new test device and is tested (box 426 and 436). Since there more than three devices in the loop segments, the method returns to box 421 where it is determined that Device 19 passes. In this situation, either Device 20 or 21 can be selected as the new test device in box 431. After selecting Device 20 and testing Device 20, it is determined that there is less than 3 devices in the loop segment. In box 448 it is determined that Device 20 fails. Therefore the faulty link is between Devices 19 and 20.

Example 3

Assume Device 37 is a Faulty Device

After determining that there is at least one link error between the initiator and the last device, the divide and conquer test methodology shown in FIG. 4a may be used to isolate the faulty link. Device 30 in network loop 200 may be selected as the first test device because it is the middle device in network loop 200 (box 405). Although it may be preferable to select one of the devices in the middle of the loop for the first test device, it is not necessary. The first test device is tested (box 410) and passes the test (box 420). This suggests there is at least one suspect link is after the first test device.

Device 45, which is located midway between the previous test device (Device 30) and the last test device, may be selected as the new test device (box 430). Device 45 is tested (440) and fails the test (box 450). This suggests that the suspect link is located between Device 30 and Device 45.

Device 44 is selected as the new test device (box 460). Device 44 is selected by decrementing Device 45 by 1. Device 44 is tested (box 470) and fails the test (480). Next, Device 43 is selected as the new test device (box 460). Device 43 is tested (box 470) and passes the test (box 480). Repeating boxes 460, 470, and 480 until Device 36 is selected as the new test device (box 460). Device 36 is tested (box 470) and passes the test (box 480). This suggests that the faulty link is between Devices 36 and 37.

Figure 5:
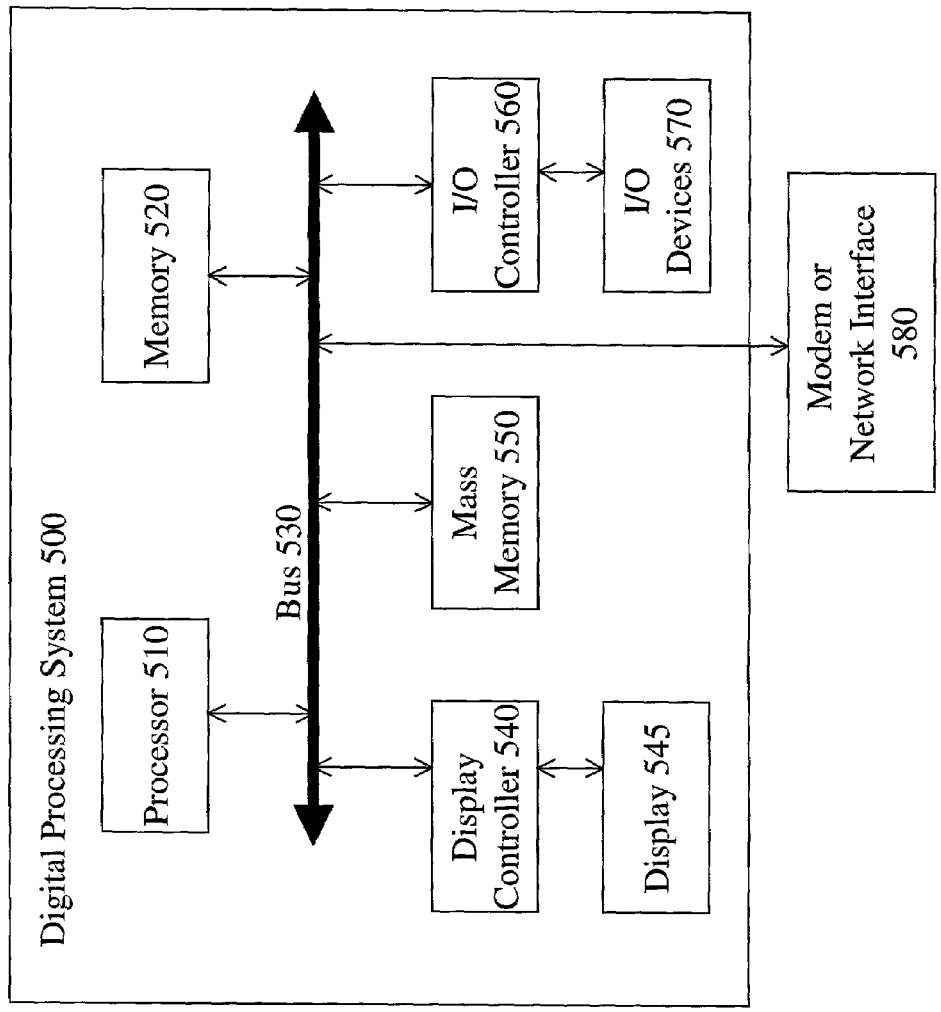
FIG. 5 is a block diagram of a digital processing system which may be used in accordance with one embodiment of the present invention.

FIG. 5 is a block diagram of a digital processing system which may be used in accordance with one embodiment of the present invention. For example, the digital processing system 600 may represent Servers 110 or 120 in shown in FIG. 1.

The digital processing system 500 includes a processor 510, which may represent one or more conventional types of such processors, such as an Intel Pentium (or x86) processor, a Sun SPARC processor, etc. A memory 520 is coupled to processor 510 by a bus 530. The memory 520 may be a dynamic random access memory (RAM) and/or may include static RAM (SRAM). The processor 510 may also be coupled to other types of storage areas/memories (e.g., cache, Flash memory, disk, etc.), which could be considered as part of memory 520 or separate from memory 520.

The bus 530 further couples processor 510 to a display controller 540, a mass memory 550, the modem or network interface 580, and input/output controller 560. The mass memory 550 may represent a magnetic, optical, magneto-optical, tape, and/or other type of machine-readable medium/device for storing information. For example, mass memory 550 may represent hard disk, a read-only or writeable optical CD, etc. The display controller 540 controls in a conventional manner a display 545, which may represent a cathode ray tube (CRT) display, a liquid crystal display (LCD), a plasma display, or other type of display device. The I/O controller 560 controls I/O device(s) 570, which may include one or more keyboards, mouse or other pointing devices, magnetic and/or optical disk drivers, printers, scanners, digital cameras, microphones, etc.

It will be appreciated that the digital processing system 500 represents only one example of a system, which may have many different configurations and architectures, and which may be employed with the present invention.

Figure 6:
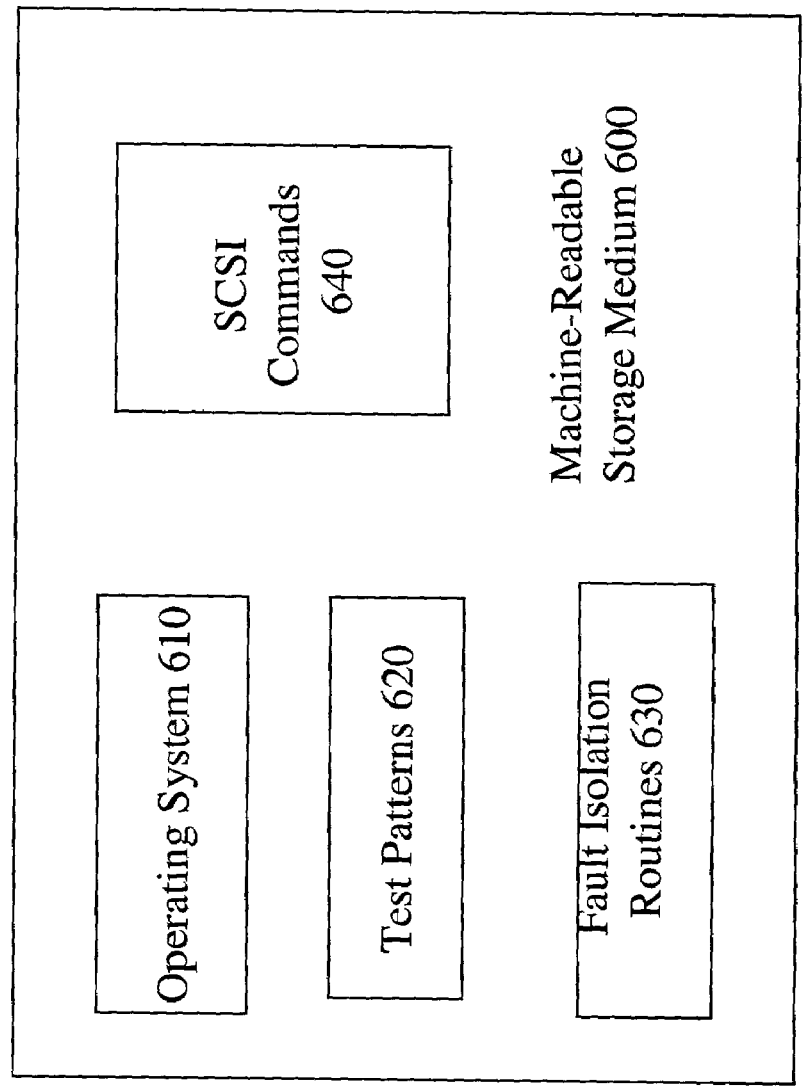
FIG. 6 is an example of a machine readable storage medium that may be accessed by a digital processing system, such as a server, according to one embodiment of the present invention.

FIG. 6 is an example of a computer/machine readable medium that may be accessed by a digital processing system, such as a server, according to one embodiment of the invention. It will be appreciated that the actual memory that stores the elements shown in and described below with reference to FIG. 6 may be one or several elements, such as one or more disks (which may, for example be magnetic, optical, magneto-optical, etc.), the memory 520 and/or the mass memory 550 described above with reference to FIG. 5. Furthermore, in one embodiment where the server, with which the machine readable storage medium shown in FIG. 6 is associated, is a network computer, one or more of the elements of the machine readable storage medium may be stored at another digital processing system and downloaded to the server. Furthermore, the elements described with reference to the machine-readable storage medium may, at some point in time, be stored in a non-volatile mass memory (e.g., a hard disk). Conversely, at other times, the elements of the machine storage medium may be dispersed between difference storage areas, such as DRAM, SRAM, disk, etc.

FIG. 6 shows a machine-readable storage medium 600. In one embodiment, the machine-readable storage medium is utilized, at least in part, to isolate faulty links in a network loop. The machine-readable storage medium 600 includes a number of elements. For example, the machine-readable medium 600 includes software for providing operating system functionality to a digital processing system, such as a server, as depicted by operation system 610. In addition, machine-readable storage medium 600 includes a test pattern storage area 620 and a SCSI Command area 640. SCSI commands such as the read and write buffer commands as well as other non-intrusive SCSI command are stored in 640. The SCSI write commands may be used to write test pattern to the target device and the SCSI read commands may be used to read the test patterns from the target device. Machine readable medium 600 also includes fault isolation routines for isolating the faulty links in the network loop. One example of a fault isolation routine is illustrated in FIG. 3.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of isolating faulty links in a loop in a network, comprising:
   testing a link between a last device and an initiator in the loop;
   testing the loop between the initiator and the last device; and
   if a faulty link is identified between the initiator and the last device,
   selecting a first device located in the loop between the initiator and the last device, wherein at least one other device is located between the initiator and the first device;
   testing the first device;
   determining whether the faulty link lies between the initiator and the first device based on results of the testing of the first device; and
   repeating, until the faulty link has been isolated, the steps of (a) selecting a new test device located in a portion of the loop in which the faulty link lies and (b) testing the new test device.

2. The method of claim 1, further comprising, repeating loop passes, until the loop between the initiator and the last device passes the testing, the steps of:
   testing the loop between the initiator and the last device; and
   isolating the faulty link.

3. The method of claim 1, further comprising identifying a faulty device.

4. The method of claim 1, wherein said testing the link between the last device and the initiator in the loop comprises performing a SCSI write buffer command and one or more SCSI read buffer commands.

5. The method of claim 1, wherein said testing the loop between the initiator and the last device comprises performing one or more SCSI write buffer commands.

6. A method of testing links in a network loop, comprising:
   writing a test pattern to a last device in the loop and reading the test pattern from the last device in the loop one or more times;
   determining whether a link between the last device and an initiator in the loop is a faulty link;
   writing one or more test patterns to the last device one or more times;
   determining whether a loop segment between the initiator and the last device includes at least one faulty link; and
   isolating the at least one faulty link in the loop segment;
   wherein said isolating the at least one faulty link in the loop segment comprises:
      selecting a first test device, the first test device located between the initiator and the last device in the loop;
      writing one or more test patterns to the first test device one or more times;
      if a write error is detected, isolating a faulty link in a loop segment between the initiator and the first test device; and
      if a write error is not detected, isolating a faulty link in a loop segment between the first test device and the last device.

7. The method of claim 6, wherein said selecting the first test device comprises accessing a counter in a fibre channel device.

8. The method of claim 6, wherein at least one test pattern of the one or more test patterns written to the first test device one or more times is a test pattern specified in a jitter specification standard.

9. The method of claim 6, wherein said isolating the faulty link in the loop segment between the initiator and the first test device comprises:
   a. selecting a new test device, the new test device located between the initiator and the previous test device;
   b. writing one or more test patterns to the new test device one or more times;
   c. if a write error is detected, selecting a new test device between the initiator and the previous test device;
   d. repeating b and c until a write error is not detected;
   e. if a write error is not detected, selecting a new test device by incrementing the previous test device by one;
   f. writing one or more test patterns to the new test device one or more times; and
   g. repeating c and f until a write error is detected.

10. The method of claim 6, wherein said isolating the faulty link in the segment between the first test device and the last device comprises:
    h. selecting a new test device, the new test device located in a loop segment between the previous test device and the last device;
    i. writing one or more test patterns to the new test device one or more times;
    j. if a write error is not detected, selecting a new test device between the previous test device and the last device;
    k. repeating b and c until a write error is detected;
    l. if a write error is detected, selecting a new test device by decrementing the previous test device by one;
    m. writing one or more test patterns to the new test device one or more times; and
    n. repeating l and m until a write error is not detected.

11. The method of claim 10, wherein said writing one or more test patterns to the new test device one or more times comprises writing one or more SCSI write buffer commands to the new test device one or more times.

12. The method of claim 6, wherein said isolating the faulty link in the loop segment between the initiator and the first test device comprises:
    a. selecting a new test device, the new test device located halfway down a loop segment between the initiator and the previous test device;
    b. writing one or more test patterns to the new test device one or more times;
    c. if a write error is detected, selecting a new test device halfway down a loop segment between the previous test device and one of the initiator and a prior previous test device;
    d. if a write error is not detected, selecting a new test device halfway up a loop segment between the previous test device and the prior previous test device;
    e. repeating b, c, and d until there are less than three devices in the loop segment being tested;
    f. if a write error is detected, rounding down one from the new test device to identify the faulty link; and
    g. if a write error is not detected, rounding up one from the new test device to identify the faulty link.

13. The method of claim 6, wherein said isolating the faulty link in the loop segment between the first test device and the last device comprises:
    h. selecting a new test device, the new test device located halfway up a loop segment between the previous test device and the last device;
    i. writing one or more test patterns to the new test device one or more times;

j. if a write error is detected, selecting a new test device halfway down a loop segment between a prior previous test device and the previous test device;

k. if a write error is not detected, selecting a new test device halfway up a loop segment between the previous test device and one of the prior previous test device and the last device;

l. repeating i, j, and k until there are less than three devices in the loop segment being tested, m. if a write error is detected, rounding down one from the new test device to identify the faulty link; and n. if a write error is not detected, rounding up one from the new test device to identify the faulty link.

14. The method of claim 13, wherein said writing one or more test patterns to the new test device one or more times comprises writing one or more SCSI write buffer commands to the new test device one or more times.

15. The method of claim 6, further comprising isolating a faulty device from the faulty link.

16. A method of testing links in a network loop, comprising:

sending a SCSI write buffer command to a last device n the network loop;

sending one or more SCSI read buffer commands to the last device;

determining whether the link between the last device and an initiator in the network loop is a faulty link;

sending one or more SCSI write buffer commands to the last device;

selecting a first test device located in the loop between the initiator and the last device, wherein the loop includes at least one other device between the initiator and the first test device;

testing the first test device using one or more SCSI commands;

determining whether a faulty link lies between the initiator and the first test device based on results of the testing of the first test device; and repeating, until a faulty link has been isolated, the steps of (a) selecting a new test device located in a portion of the loop in which the faulty link lies and (b) testing the new test device using one or more SCSI commands.

17. The method of claim 16, wherein said selecting the first test device comprises accessing a counter in a fibre channel device.

18. The method of claim 16, wherein said repeating comprises:

if a write error is detected in said testing the first test device, a. selecting a new test device, the new test device located between the initiator and the previous test device;

b. sending one or more SCSI write buffer commands to the new test device;

c. if a write error is detected, selecting a new test device between the initiator and the previous test device;

d. repeating b and c until a write error is not detected;

e. if a write error is not detected, selecting a new test device by incrementing the previous test device by one;

f. sending one or more SCSI write buffer commands to the new test device; and g. repeating e and f until a write error is detected;

if a write error is not detected, h. selecting a new test device, the new test device located in a loop segment between the previous test device and the initiator;

i. sending one or more SCSI write buffer commands to the new test device;

j. if a write error is not detected, selecting a new test device between the previous test device and the last device;

k. repeating b and c until a write error is detected;

l. if a write error is detected, selecting a new test device by decrementing the previous test device by one;

m. sending one or more SCSI write buffer commands to the new test device; and n. repeating l and m until a write error is not detected.

19. The method of claim 16, wherein said repeating comprises:

if a write error is detected in said testing the first test device, a. selecting a new test device, the new test device located halfway down a loop segment between the initiator and the previous test device;

b. sending one or more SCSI write buffer commands to the new test device; and c. if a write error is detected, selecting a new test device halfway down a loop segment between the previous test device and one of the initiator and a prior previous test device;

d. if a write error is not detected, selecting a new test device halfway up a loop segment between the previous test device and the prior previous test device;

e. repeating b, c, and d until there are less than three devices in the loop segment being tested;

f. if a write error is detected, rounding down one from the new test device to identify the faulty link; and g. if a write error is not detected, rounding up one from the new test device to identify the faulty link;

if a write error is not detected, h. selecting a new test device, the new test device located halfway up a loop segment between the previous test device and the last device;

i. sending one or more SCSI write buffer commands to the new test device; and j. if a write error is detected, selecting a new test device halfway down a loop segment between the prior previous test device and the previous test device;

k. if a write error is not detected, selecting a new test device halfway up a loop segment between the previous test device and one of a prior previous test device and the last device;

l. repeating i, j, and k until there are less than three devices in the loop segment being tested;

m. if a write error is detected, rounding down one from the new test device to identify the faulty link; and n. if a write error is not detected, rounding up one from the new test device to identify the faulty link.

20. The method of claim 16, further comprising isolating a faulty device from the faulty link.

21. A machine readable medium containing executable program instructions, which when executed on a digital processing system cause the digital processing system to perform a method comprising:

writing a test pattern to a last device in the loop and reading the test pattern from the last device in the loop one or more times;

determining whether a link between the last device and an initiator in the loop is a faulty link;

writing one or more test patterns to the last device one or more times;

determining whether a loop segment between the initiator and the last device includes at least one faulty link; and
isolating the at least one faulty link in the loop segment;
wherein said isolating the at least one faulty link in the loop segment comprises:
selecting a first test device, the first test device located between the initiator and the last device in the loop;
writing one or more test patterns to the first test device one or more times;
if a write error is detected, isolating the faulty link in a loop segment between the initiator and the first test device; and
if a write error is not detected, isolating the faulty link in a loop segment between the first test device and the last device.

22. The machine readable medium of claim 21, wherein said method further comprises isolating at least one faulty device.

23. The machine readable medium of claim 21, wherein said selecting the first test device comprises accessing a counter in a fibre channel device.

24. The machine readable medium of claim 21, wherein said isolating the faulty link in the loop segment between the initiator and the first test device comprises:
a. selecting a new test device, the new test device located between the initiator and the previous test device;
b. writing one or more test patterns to the new test device one or more times;
c. if a write error is detected, selecting a new test device between the initiator and the previous test device;
d. repeating b and c until a write error is not detected;
e. if a write error is not detected, selecting a new test device by incrementing the previous test device by one;
f. writing one or more test patterns to the new test device one or more times; and
g. repeating e and f until a write error is detected.

25. The machine readable medium of claim 21, wherein said isolating the faulty link in the segment between the first test device and the last device comprises:
h. selecting a new test device, the new test device located in a loop segment between the previous test device and the last device;
i. writing one or more test patterns to the new test device one or more times;
j. if a write error is not detected, selecting a new test device between the previous test device and the last device;
k. repeating b and c until a write error is detected;
l. if a write error is detected, selecting a new test device by decrementing the previous test device by one;
m. writing one or more test patterns to the new test device one or more times; and
n. repeating l and m until a write error is not detected.

26. The machine readable medium of claim 21, wherein said isolating the faulty link in the loop segment between the initiator and the first device comprises:
a. selecting a new test device, the new test device located halfway down a loop segment between the initiator and the previous test device;
b. writing one or more test patterns to the new test device one or more times; and
c. if a write error is detected, selecting a new test device halfway down a loop segment between the previous test device and one of the initiator and a prior previous test device;
d. if a write error is not detected, selecting a new test device halfway up a loop segment between the previous test device and the prior previous test device;
e. repeating b, c, and d until there are less than three devices in the loop segment being tested;
f. if a write error is detected, rounding down one from the new test device to identify the faulty link; and
g. if a write error is not detected, rounding up one from the new test device to identify the faulty link.

27. The machine readable medium of claim 21, wherein said isolating the faulty link in the loop segment between the first device and the last device comprises:
h. selecting a new test device, the new test device located halfway up a loop segment between the previous test device and the last device;
i. writing one or more test patterns to the new test device one or more times; and
j. if a write error is detected, selecting a new test device halfway down a loop segment between a prior previous test device and the previous test device;
k. if a write error is not detected, selecting a new test device halfway up a loop segment between the previous test device and one of the prior previous test device and the last device; and
l. repeating i, j, and k until there are less than three devices in the loop segment being tested,
m. if a write error is detected, rounding down one from the new test device to identify the faulty link; and
n. if a write error is not detected, rounding up one from the new test device to identify the faulty link.

28. A machine readable medium containing executable program instructions, which when executed on a digital processing system cause the digital processing system to perform a method comprising:
sending a SCSI write buffer command to a last device in the network loop;
sending one or more SCSI read buffer commands to the last device;
determining whether the link between the last device and an initiator in the network loop is a faulty link;
sending one or more SCSI writ buffer commands to the last device;
performing selecting a first test device located in the loop between the initiator and the last device, wherein the loop includes at least one other device between the initiator and the first test device;
testing the first test device using one or more SCSI commands;
determining whether a faulty link lies between the initiator and the first test device based on results of the testing of the first test device;
repeating, until a faulty link has been isolated, the steps of (a) selecting a new test device located in a portion of the loop in which the faulty link lies and (b) testing the new test device using one or more SCSI commands.

29. The machine readable medium of claim 28, wherein said method further comprises isolating the at least one faulty device.

30. A system for isolating faulty links in a loop of network devices, including a last device and an initiator, comprising:
an interface to communicate with the loop of network devices;
a processing unit;
code executed by the processing unit to perform operations, the operations comprising:
(i) testing via the interface a link between the last device and the initiator in the loop;

(ii) testing via the interface the loop between the initiator and the last device; and (iii) if a faulty link is identified between the initiator and the last device, selecting a first device located in the loop between the initiator and the last device, wherein at least one other device is located between the initiator and the first device;

testing the first device via the interface;

determining whether the faulty link lies between the initiator and the first device based on results of the testing of the first device;

repeating, until the faulty link has been isolated, the steps of (a) selecting a new test device located in a portion of the loop in which the faulty link lies and (b) testing the new test device via the interface.

31. The system of claim 30, wherein the operations further comprise:

repeating, until the loop between the initiator and the last device passes the testing, the steps of:

testing via the interface the loop between the initiator and the last device; and isolating the faulty link.

32. The system of claim 30, wherein the operations further comprise:

identifying a faulty device.

33. The system of claim 30, wherein said testing the link between the last device and the initiator in the loop comprises performing via the interface a SCSI write buffer command and one or more SCSI read buffer commands.

34. The system of claim 30, wherein said testing the loop between the initiator and the last device comprises performing one or more SCSI write buffer commands via the interface.

35. A system for testing links in a loop of network devices, including a last device and an initiator, comprising:

an interface to communicate with the loop of network devices;

a processing unit;

code executed by the processing unit to perform operations, the operations comprising:

(i) writing via the interface a test pattern to a last device in the loop and reading the test pattern from the last device in the loop one or more times;

(ii) determining whether a link between the last device and an initiator in the loop is a faulty link;

(iii) writing one or more test patterns via the interface to the last device one or more times; and (iv) determining whether a loop segment between the initiator and the last device includes at least one faulty link;

(v) isolating the at least one faulty link in the loop segment; wherein said isolating comprises:

selecting a first test device, the first test device located between the initiator and the last device in the loop;

writing via the interface one or more test patterns to the first test device one or more times;

if a write error is detected, isolating the faulty link in a loop segment between the initiator and the first test device; and if a write error is not detected, isolating the faulty link in a loop segment between the first test device and the last device.

36. The system of claim 35, wherein said selecting the first test device comprises accessing a counter in a fibre channel device.

37. The system of claim 35, wherein at least one test pattern of the one or more test patterns written via the interface to the first test device one or more times is a test pattern specified in a jitter specification standard.

38. The system of claim 35, wherein said isolating the faulty link in the loop segment between the initiator and the first test device comprises:

a. selecting a new test device, the new test device located between the initiator and the previous test device;

b. writing via the interface one or more test patterns to the new test device one or more times;

c. if a write error is detected, selecting a new test device between the initiator and the previous test device;

d. repeating b and c until a write error is not detected;

e. if a write error is not detected, selecting a new test device by incrementing the previous test device by one;

f. writing via the interface one or more test patterns to the new test device one or more times; and g. repeating e and f until a write error is detected.

39. The system of claim 35, wherein said isolating the faulty link in the segment between the first test device and the last device comprises:

h. selecting a new test device, the new test device located in a loop segment between the previous test device and the last device;

i. writing via the interface one or more test patterns to the new test device one or more times;

j. if a write error is not detected, selecting a new test device between the previous test device and the last device;

k. repeating b and c until a write error is detected;

l. if a write error is detected, selecting a new test device by decrementing the previous test device by one;

m. writing one or more test patterns to the new test device one or more times; and n. repeating l and m until a write error is not detected.

40. The system of claim 39, wherein said writing one or more test patterns to the new test device one or more times comprises writing one more SCSI write buffer commands to the new test device one or more times.

41. The system of claim 35, wherein said isolating the faulty link in the loop segment between the initiator and the first test device comprises:

a. selecting a new test device, the new test device locate halfway down a loop segment between the initiator and the previous test device;

b. writing via the interface one or more test patterns to the new test device one or more times;

c. if a write error is detected, selecting a new test device halfway down a loop segment between the previous test device and one of the initiator and a prior previous test device;

d. if a write error is not detected, selecting a new test device halfway up a loop segment between the previous test device and the prior previous test device;

e. repeating b, c, and d until there are less than three devices in the loop segment being tested;

f. if a write error is detected, rounding down one from the new test device to identify the faulty link; and g. if a write error is not detected, rounding up one from the new test device to identify the faulty link.

42. The system of claim 35, wherein said isolating the faulty link in the loop segment between the first test device and the last device comprises:

h. selecting a new test device, the new test device located halfway up a loop segment between the previous test device and the last device;
i. writing via the interface one or more test patterns to the new test device one or more times;
j. if a write error is detected, selecting a new test device halfway down a loop segment between a prior previous test device and the previous test device;
k. if a write error is not detected, selecting a new test device halfway up a loop segment between the previous test device and one of the prior previous test device and the last device;
l. repeating i, j, and k until there are less than three devices in the loop segment being tested,
m. if a write error is detected, rounding down one from the new test device to identify the faulty link; and
n. if a write error is not detected, rounding up one from the new test device to identify the faulty link.

43. The system of claim 42, wherein said writing one or more test patterns to the new test device one or more times comprises writing one or more SCSI write buffer commands to the new test device one or more times.

44. The system of claim 35, wherein the operations further comprise:
isolating a faulty device from the faulty link.

45. A system for testing links in a loop of network devices, including a last device and an initiator, comprising:
an interface to communicate with the loop of network devices;
a processing unit;
code executed by the processing unit to perform operations, the operations comprising:
(i) sending a SCSI write buffer command via the interface to a last device in the network loop;
(ii) sending one or more SCSI read buffer commands via the interface to the last device;
(iii) determining whether the link between the last device and an initiator in the network loop is a faulty link;
(iv) sending one or more SCSI write buffer commands via the interface to the last device;
(v) selecting a first test device located in the loop between the initiator and the last device, wherein the loop includes at least one other device between the initiator and the first test device;
(vi) testing the first test device using one or more SCSI commands via the interface;
(vii) determining whether a faulty link lies between the initiator and the first test device based on results of the testing of the first test device; and
(viii) repeating, until a faulty link has been isolated, the steps of (a) selecting a new test device located in a portion of the loop in which the faulty link lies and (b) testing the new test device using one or more SCSI commands via the interface.

46. The system of claim 45, wherein said selecting the first test device comprises accessing a counter in a fibre channel device.

47. The system of claim 45, wherein said repeating comprises:
if a write error is detected in testing the first test device,
a. selecting a new test device, the new test device located between the initiator and the previous test device;
b. sending via the interface one or more SCSI write buffer commands to the new test device;
c. if a write error is detected, selecting a new test device between the initiator and the previous test device;
d. repeating b and c until a write error is not detected;
e. if a write error is not detected, selecting a new test device by incrementing the previous test device by one;
f. sending via the interface one or more SCSI write buffer commands to the new test device; and
g. repeating e and f until a write error is detected;
if a write error is not detected,
h. selecting a new test device, the new test device located in a loop segment between the previous test device and the initiator;
i. sending via the interface one or more SCSI write buffer commands to the new test device;
j. if a write error is not detected, selecting a new test device between the previous test device and the last device;
k. repeating b and c until a write error is detected;
l. if a write error is detected, selecting a new test device by decrementing the previous test device by one;
m. sending via the interface one or more SCSI write buffer commands to the new test device; and
n. repeating l and m until a write error is not detected.

48. The system of claim 45, wherein said repeating comprises:
if a write error is detected in testing the first test device;
a. selecting a new test device, the new test device located halfway down a loop segment between the initiator and the previous test device;
b. sending via the interface one or more SCSI write buffer commands to the new test device; and
c. if a write error is detected, selecting a new test device halfway down a loop segment between the previous test device and one of the initiator and a prior previous test device;
d. if a write error is not detected, selecting a new test device halfway up a loop segment between the previous test device and the prior previous test device;
e. repeating b, c, and d until there are less than three devices in the loop segment being tested;
f. if a write error is detected, rounding down one from the new test device to identify the faulty link; and
g. if a write error is not detected, rounding up one from the new test device to identify the faulty link;
if a write error is not detected,
h. selecting a new test device, the new test device located halfway up a loop segment between the previous test device and the last device;
i. sending via the interface one or more SCSI write buffer commands to the new test device; and
j. if a write error is detected, selecting a new test device halfway down a loop segment between the prior previous test device and the previous test device;
k. if a write error is not detected, selecting a new test device halfway up a loop segment between the previous test device and one of a prior previous test device and the last device;
l. repeating i, j, and k until there are less than three devices in the loop segment being tested;
m. if a write error is detected, rounding down one from the new test device to identify the faulty link; and
n. if a write error is not detected, rounding up one from the new test device to identify the faulty link.

49. The system of claim 45, wherein the operations further comprise:
    isolating a faulty device from the faulty link.

50. A method of testing links in a network loop, comprising:
    sending a SCSI write buffer command to a last device in the network loop;
    sending one or more SCSI read buffer commands to the last device;
    determining whether the link between the last device and an initiator in the network loop is a faulty link;
    sending one or more SCSI write buffer commands to the last device;
    determining whether a loop segment between the initiator and the last device includes at least one faulty link; and
    isolating the at least one faulty link in the loop segment;
    wherein said isolating the at least one family link in the loop segment comprises:
        selecting a first test device, the first test device located between the initiator and the last device in the loop;
        sending one or more SCSI write buffer commands to the new test device;
        if a write error is detected,
            a. selecting a new test device, the new test device located between the initiator and the previous test device;
            b. sending one or more SCSI write buffer commands to the new test device;
            c. if a write error is detected, selecting a new test device between the initiator and the previous test device;
            d. repeating b and c until a write error is not detected;
            e. if a write error is not detected, selecting a new test device by incrementing the previous test device by one;
            f. sending one or more SCSI write buffer commands to the new test device; and
            g. repeating e and f until a write error is detected;
        if a write error is not detected,
            h. selecting a new test device, the new test device located in a loop segment between the previous test device and the initiator;
            i. sending one or more SCSI write buffer commands to the new test device;
            j. if a write error is not detected, selecting a new test device between the previous test device and the last device;
            k. repeating b and c until a write error is detected;
            l. if a write error is detected, selecting a new test device by decrementing the previous test device by one;
            m. sending one or more SCSI write buffer commands to the new test device; and
            n. repeating l and m until a write error is not detected.

51. A method of testing links in a network loop, comprising:
    sending a SCSI write buffer command to a last device n the network loop;
    sending one or more SCSI read buffer commands to the last device;
    determining whether the link between the last device and an initiator in the network loop is a faulty link;
    sending one or more SCSI write buffer commands to the last device;
    determining whether a loop segment between the initiator and the last device includes at least one faulty link; and
    isolating the at least one faulty link in the loop segment;
    wherein said isolating the at least one faulty link in the loop segment comprises:
        selecting a first test device, the first test device located between the initiator and the last device in the loop;
        sending one or more SCSI write buffer commands to the new test device;
        if a write error is detected,
            a. selecting a new test device, the new test device located halfway down a loop segment between the initiator and the previous test device;
            b. sending one or more SCSI write buffer commands to the new test device; and
            c. if a write error is detected, selecting a new test device halfway down a loop segment between the previous test device and one of the initiator and a prior previous test device;
            d. if a write error is not detected, selecting a new test device halfway up a loop segment between the previous test device and the prior previous test device;
            e. repeating b, c, and d until there are less than three devices in the loop segment being tested;
            f. if a write error is detected, rounding down one from the new test device to identify the faulty link; and
            g. if a write error is not detected, rounding up one from the new test device to identify the faulty link;
        if a write error is not detected,
            h. selecting a new test device, the new test device located halfway up a loop segment between the previous test device and the last device;
            i. sending one or more SCSI write buffer commands to the new test device; and
            j. if a write error is detected, selecting a new test device halfway down a loop segment between the prior previous test device and the previous test device;
            k. if a write error is not detected, selecting a new test device halfway up a loop segment between the previous test device and one of a prior previous test device and the last device;
            l. repeating i, j, and k until there are less than three devices in the loop segment being tested;
            m. if a write error is detected, rounding down one from the new test device to identify the faulty link; and
            n. if a write error is not detected, rounding up one from the new test device to identify the faulty link.

52. A system for testing links in a loop of network devices, including a last device and an initiator, comprising:
    an interface to communicate with the loop of network devices;
    a processing unit;
    code executed by the processing unit to perform operations, the operations comprising:
        (i) sending a SCSI write buffer command via the interface to a last device in the network loop;
        (ii) sending one or more SCSI read buffer commands via the interface to the last device;
        (iii) determining whether the link between the last device and an initiator in the network loop is a faulty link;
        (iv) sending one or more SCSI write buffer commands via the interface to the last device;
        (v) determining whether a loop segment between the initiator and the last device includes at least one faulty link; and
        (vi) isolating the at least one faulty link in the loop segment;

wherein said isolating the at least one faulty link in the loop segment comprises:
selecting a first test device, the first test device located between the initiator and the last device in the loop;
sending via the interface one or more SCSI write buffer commands to the new test device;
if a write error is detected,
  a. selecting a new test device, the new test device located between the initiator and the previous test device;
  b. sending via the interface one or more SCSI write buffer commands to the new test device;
  c. if a write error is detected, selecting a new test device between the initiator and the previous test device;
  d. repeating b and c until a write error is not detected;
  e. if a write error is not detected, selecting a new test device by incrementing the previous test device by one;
  f. sending via the interface one or more SCSI write buffer commands to the new test device; and
  g. repeating e and f until a write error is detected;
if a write error is not detected,
  h. selecting a new test device, the new test device located in a loop segment between the previous test device and the initiator;
  i. sending via the interface one or more SCSI write buffer commands to the new test device;
  j. if a write error is not detected, selecting a new test device between the previous test device and the last device;
  k. repeating b and c until a write error is detected;
  l. if a write error is detected, selecting a new test device by decrementing the previous test device by one;
  m. sending via the interface one or more SCSI write buffer commands to the new test device; and
n. repeating l and m until a write error is not detected.

53. A system for testing links in a loop of network devices, including a last device and an initiator, comprising:
an interface to communicate with the loop of network devices;
a processing unit;
code executed by the processing unit to perform operations, the operations comprising:
  (i) sending a SCSI write buffer command via the interface to a last device in the network loop;
  (ii) sending one or more SCSI read buffer commands via the interface to the last device;
  (iii) determining whether the link between the last device and an initiator in the network loop is a faulty link;
  (iv) sending one or more SCSI write buffer commands via the interface to the last device;
  (v) determining whether a loop segment between the initiator and the last device includes at least one faulty link; and
  (vi) isolating the at least one faulty link in the loop segment;
wherein said isolating the at least one faulty link in the loop segment comprises:
selecting a first test device, the first test device located between the initiator and the last device in the loop;
sending via the interface one or more SCSI write buffer commands to the new test device;
if a write error is detected,
  a. selecting a new test device, the new test device located halfway down a loop segment between the initiator and the previous test device;
  b. sending via the interface one or more SCSI write buffer commands to the new test device; and
  c. if a write error is detected, selecting a new test device halfway down a loop segment between the previous test device and one of the initiator and a prior previous test device;
  d. if a write error is not detected, selecting a new test device halfway up a loop segment between the previous test device and the prior previous test device;
  e. repeating b, c, and d until there are less than three devices in the loop segment being tested;
  f. if a write error is detected, rounding down one from the new test device to identify the faulty link; and
  g. if a write error is not detected, rounding up one from the new test device to identify the faulty link;
if a write error is not detected,
  h. selecting a new test device, the new test device located halfway up a loop segment between the previous test device and the last device;
  i. sending via the interface one or more SCSI write buffer commands to the new test device; and
  j. if a write error is detected, selecting a new test device halfway down a loop segment between the prior previous test device and the previous test device;
  k. if a write error is not detected, selecting a new test device halfway up a loop segment between the previous test device and one of a prior previous test device and the last device;
  l. repeating i, j, and k until there are less than three devices in the loop segment being tested;
  m. if a write error is detected, rounding down one from the new test device to identify the faulty link; and
  n. if a write error is not detected, rounding up one from the new test device to identify the faulty link.

* * * * *

UNITED STATES PATENT AND TRADEMARK OFFICE
CERTIFICATE OF CORRECTION

PATENT NO. : 6,990,530 B1
DATED : January 24, 2006
INVENTOR(S) : Gibson et al.

It is certified that error appears in the above-identified patent and that said Letters Patent is hereby corrected as shown below:

Column 11,
Line 23, delete "loop passes, until the loop between the".

Column 16,
Line 41, delete "writ" and substitute -- write --.
Line 43, delete "performing selecting a first test device located in the loop between the initiator and the last device, wherein the loop includes at least one other device between the initiator and the first test device" and substitute -- selecting a first test device located in the loop between the initiator and the last device, wherein the loop includes at least one other device between the initiator and the first test device; --.

Column 18,
Line 47, delete "locate" and substitute -- located --.

Column 21,
Line 57, delete "n" and substitute -- in --.

Signed and Sealed this

Twenty-third Day of May, 2006

JON W. DUDAS
*Director of the United States Patent and Trademark Office*